United States Patent [19]

Hendershot

[11] Patent Number: 4,817,126

[45] Date of Patent: Mar. 28, 1989

[54] CALL BOX

[75] Inventor: James R. Hendershot, Arroyo Grande, Calif.

[73] Assignee: Signal Communications Corporation, Mandeville, La.

[21] Appl. No.: 161,157

[22] Filed: Feb. 26, 1988

[51] Int. Cl.$^4$ .............................................. H04Q 7/01
[52] U.S. Cl. ......................................... 379/58; 379/63
[58] Field of Search ....................... 379/56, 57, 58, 59, 379/60, 61, 62, 63; 455/33

[56] References Cited

U.S. PATENT DOCUMENTS

| | | | |
|---|---|---|---|
| 4,176,254 | 11/1979 | Tuttle et al. | 379/58 |
| 4,228,319 | 10/1980 | De Jager et al. | 379/60 |
| 4,443,661 | 4/1984 | Kubo | 379/58 |
| 4,554,410 | 11/1985 | Furumoto | 379/58 |
| 4,646,345 | 2/1987 | Zounek et al. | 379/62 |
| 4,680,786 | 7/1987 | Baker et al. | 379/60 |
| 4,724,538 | 2/1988 | Farrel | 379/59 |
| 4,744,101 | 5/1988 | Saegusa | 379/61 |
| 4,783,844 | 11/1988 | Higasniyama et al. | 455/34 |

Primary Examiner—Robert Lev
Attorney, Agent, or Firm—Daniel C. McKown

[57] ABSTRACT

A communication system having a base station and a number of field units employs a virtual hold technique and a self-testing technique. In the virtual hold technique, when a field unit is put on hold, the communication channel previously used by the field unit is released for use elsewhere in the system, thereby increasing the efficiency of the system. In the self-test technique, a test signal is transmitted to the field unit where it is applied to the earpiece of a handset so as to generate sound waves which are picked up by the microphone in the mouthpiece of the handset and transmitted back to the base station for comparison with the original test signal. In this manner, the entire communication loop is tested without the need for human intervention, and in particular without the need for a person to be present at the field unit. The self-test technique improves the reliability of the system.

7 Claims, 5 Drawing Sheets

CALL BOX

BACKGROUND OF THE INVENTION

1. Field of the Invention

The present invention is in the field of communication systems and specifically relates to a virtual hold technique and a self-testing technique for use in such systems.

2. The Prior Art

In U.S. Pat. No. 4,176,254, Tuttle, et al. show a solar powered call box system that is capable of transmitting voice and data. The system includes a plurality of emergency switches marked with symbols corresponding to various emergency conditions.

Cannalte, et al., in U.S. Pat. No. 3,939,417 show a system in which, if the primary channel is busy, a second caller is switched to a second channel. When the first call is completed, the second call is connected to the primary channel. The console operator can interrogate any of the call boxes to determine their status.

In U.S. Pat. No. 4,406,995, May shows an improved method and apparatus by which a base station can monitor the state of several functions in a call box.

The above-described patents are the most relevant ones known in regard to the virtual hold features of the present invention, and the patents mentioned in the following paragraphs are the known patents that are closest to the self-testing feature of the present invention.

In U.S. Pat. No. 3,598,929, Seldman describes a test instrument capable of being carried into the field by a repairman, and that provides a standardized acoustic source, a standardized audio frequency oscillator, and an audio frequency voltmeter. Using these items, the repairman can determine whether the microphone or the speaker of the telephone instrument is defective and whether the loop between the instrument and the central office is defective. A comparable instrument is described in U.S. Pat. No. 3,261,926 to Bryant, et al.

In U.S. Pat. No. 4,037,222 issued in 1977 to Solomon, there is shown a system for supervising a number of loudspeakers to determine whether they are operating. A transducer is mounted on and sensitive to vibrations of a speaker cone to produce a signal that indicates whether the speaker is operating. This signal is fed back to the central office on a separate supervisory wire, or on the same wires that power the speakers, but in a different frequency band.

Although the above patents show that much work has been done in the general field of call boxes, none of the patents describes or suggests the specific features that will be described below.

SUMMARY OF THE INVENTION

The present invention was conceived for use in a solar powered call box system of the type installed along freeways and highways for use by motorists in distress. The nature of the distress may range from relatively minor problems such as vehicle disablement or running out of gasoline, to serious emergencies such as accidents where personal injuries have occurred and it is necessary to summon medical help with the greatest urgency. Clearly the need for a call box system that is very highly dependable and that puts the call through with minimum delay can be appreciated. In fact, malfunction of the call box or excessive delay in placing the calls might give rise to legal liability on the part of the municipality responsible for the call box system.

Although every effort is normally made to assure that the call box system is properly fabricated and installed, these steps alone may not be sufficient. Because of the limited amount of bandwidth available, the number of communication channels that can be allocated to a radio call box system is necessarily limited. The limited number of allocated channels makes it highly desirable that the channels be used as effectively as possible.

For example, at least in some of the earlier call box systems, it was common design practice to assign permanently a communications channel to each of the call boxes. Since most call boxes are in active use only a small fraction of the time, most of the allocated channels were idle most of the time.

To remedy this situation, designers recently developed channel assignment schemes whereby the number of call boxes considerably exceeds the number of allocated channels. This was a major step in the evolution of radio communication systems, but still further improvement was possible.

For example, when such a system experiences an unexpected inrush of calls, it may be necessary for the operator to answer a number of calls and place them on HOLD until the operator can find time to talk with the callers at greater length. Also, sometimes it is necessary for the operator to place a call on hold while she makes a telephone call on their behalf or goes about obtaining information for the caller. Until the present invention, it was the practice to let the communication channel continue to be assigned to and tied up by the caller who had been placed on hold. This was an inefficient use of the allocated channels, and it tended to limit the number of simultaneous calls the system could handle.

The present inventor recognized the inefficiency of such a HOLD procedure and to overcome the inefficiency has invented an improved holding procedure referred to herein as VIRTUAL HOLD.

In accordance with this aspect of the present invention, when it is necessary to put a call on HOLD, the communication channel that had been used in the initial portion of the call is taken away from the calling call box; i.e., its assignment to that box is revoked, so that the communication channel is freed up for other uses, including use by another operator.

In accordance with the present invention, this is made possible by the provision of a data channel that is shared by all the call boxes and through which commands are issued to individual call boxes and the status of each call box is reported to the base station. In a preferred embodiment of the present invention, when a call is placed on hold, a command is sent to the call box, ordering it not to transmit on the communication channel, but instead to await further instructions via the data channel, and to generate at the site of the call box a HOLD tone which indicates to the caller that he is indeed on HOLD. When the conversation is to be resumed, a command is sent via the data channel to the call box telling the call box to switch to a particular channel, to which the operator is then connected. This virtual hold technique greatly improves the efficiency of the allocated communication channels.

Clearly, the virtual hold technique has application to various types of call box systems, for example, cellular systems, trunk FM radio systems, and wire line or fiber optic call box systems. Further, the virtual hold technique is by no means limited to use in call box systems;

it can improve the efficiency of other telecommunication systems where there are more trunks than operators. For example, the virtural hold technique should be particularly valuable to answering services, to public safety emergency centers such as the 911 system, and can even be used in multipleline office telephone systems. Thus, the virtual hold system of the present invention is seen to have far-reaching applications.

As mentioned above, it is not enough merely to eliminate defects in the fabrication and installation of a call box system. Every real electronic system includes components which sooner or later malfunction or fail. For this reason, good design practice indicates that emergency type equipment should be testable from time to time so that any defective parts of the system can be replaced.

As indicated by the aforementioned prior art patents of Seldman and of Bryant, et al., the usual way of testing call boxes was to send a repairman to the call box. The repairman then used various pieces of test equipment to test the call box and could then make repairs on the spot. Generally speaking, the amount of testing that could be done from the base station without having to have a repairman present at the call box was relatively small. Most of the call boxes were working satisfactorily most of the time, and therefore it was unnecessarily expensive to send a repairman to the box when no repairs were needed. Clearly some way was needed for testing the call boxes autonomously from the base station and without the need for anyone to be at the call box at the time of the test.

The present inventor has found a way of doing this, and it is described in detail below. In accordance with the present invention, a test signal is transmitted from the base station to a call box via one of the communication channels. The test signal is applied to the earphone of the handset where it produces an audible sound. This sound is picked up by the mouthpiece of the handset and transmitted via the same duplex communication channel to the base station. If the test signal received at the base station resembles the test signal originally transmitted, it is proof that the communication channel and the call box are functioning satisfactorily. The test can, of course, be repeated using other communication channels between the base station and the call box.

This novel self-testing technique can be used in many other applications than call boxes. For example, it can be used in conventional telephones, cellular telephones, pay telephones, and speaker telephones, if slight modifications are made to thosetelephones.

Thus, the present invention consists of improvements to call box and similar systems. One aspect of the invention is the virtual hold technique, and the other aspect of the invention is the self-testing technique. Both of these techniques will be described more fully below.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

The System

This introductory section of the Detailed Description gives a concise overview of the system context in which the present invention functions. It should be understood that the invention is not the overall system, but only certain features of the system, which will be described in detail below.

Figure 1:
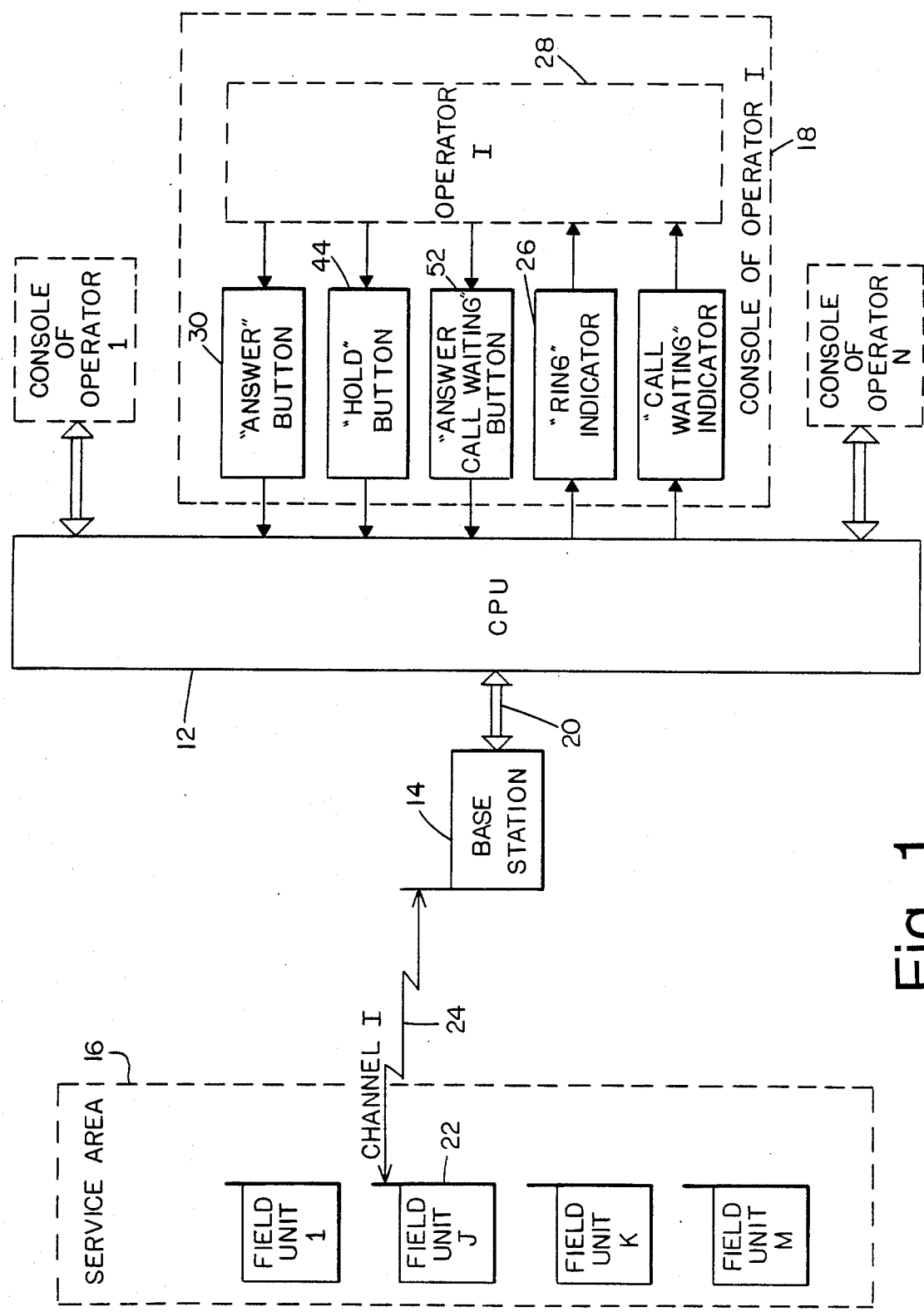
FIG. 1 is a system block diagram showing the system in which the present invention is used.

FIG. 1 is a block diagram showing the major portions of the system with which the present invention is used. Physically, the system includes a number of field units located within a service area 16. The field units may be fixed or mobile, and their positions may be known or unknown. The field units enable their users to call an operator at the base station and to receive calls from an operator at the base station. In the preferred embodiment the calls consist of two-way voice conversations; in other embodiments, data is sent by tone-pairs or other forms of encoding. In addition to conversing with the field units, the operator can place the field units in communication with other parties via the existing telephone system.

The base station contains apparatus for receiving and transmitting simultaneously in N+1 channels, where N is the number of operators. One of the channels serves as a data channel by which commands that control the operation of the field units are sent, and by which the field units report their status to the base station.

In the preferred embodiment, actual control and status data are sent by means of quadradecimal sequential signalling, which uses various tones to represent different data states. Data can also be sent via a low frequency subcarrier which is phase modulated onto a 3100 Hz pilot tone used by the amplitude companded single side band radio as a transmission reference. This subcarrier is used to mute and un-mute audio lines, and serves as an indicator of channel activity.

The various operations executed by the system are mediated by the CPU (Central Processing Unit). In the preferred embodiment, the CPU 12 is a multi-task time-shared computer system; i.e., it can perform more than one process (program) at the same time. Three main processes are used in the preferred embodiment: the switch process, the operator process, and a maintenance process. Briefly, the switch process interfaces the CPU to the field units, of which the field unit J is typical. The operator process serves as the operator's window on the system. The maintenance process, among other things, controls the self-testing feature of the system.

The switch process, which is implemented primarily in software, functions to connect various message channels to the operators. The switch process also functions as a modem, processing data passing between the field units and the CPU.

Actually, there is an operator process for each operator. The operator process receives the operator's inputs and derives from them the information that is used to make the switch process carry out a desired operation. In addition, the operator process keeps records of the calls on hold and keeps a record of the relative priority of the various calls.

The design philosophy of the system is that the intelligence of the system is located in the CPU, and that the field units merely carry out commands from the CPU, and transmit status data to the CPU.

The system includes an anti-contention routine used in the data channel. A tone on the data channel indicates whether the data channel is available for use by a field unit. If it is, the field unit begins its data transmission, which includes an identity code and a status message, such as OFF HOOK. The base station 14 responds by sending out the same identity code with an instruction such as PROVIDE EARPIECE RINGING. At this time, an indication is sent to the operator, by means of a RING indicator 26 to announce an incoming call. The operator 28 would normally answer the call by pressing the ANSWER button 30 on her console 18.

When an operator answers a call, the CPU 12 in response to depression of the ANSWER button 30 sends a command, via the data channel, to the field unit, requiring it to switch to a particular message (voice) channel and to begin transmitting. A low frequency subcarrier is used to sense the presence of message transmission, as well as to indicate to the field unit that the base station is transmitting to the field unit. Loss of subcarrier in either direction will initiate corrective action by the system to restore the call. By not assigning a message channel until the operator is ready to take the call, an unlimited number of field units can call in without getting a busy signal. In the anti-contention routine, if two field units attempt to send data on the data channel to the base station 14 at the same time, the base station will respond to one or the other, or perhaps (if conditions warrant) to neither. The field unit that failed to get through to the base station 14 will discontinue transmitting and will wait for a random length of time before trying to transmit again.

An attempt has been made in this subsection to describe briefly the system context in which the present invention is used. A complete and highly detailed description of the system is not necessary, since the invention will be described below.

Virtual Hold Feature

One of the inventive features of the system is called the Virtual Hold process. That process promotes efficiency in the following way. When a call is put on hold, the previously used message channel is made available for use by the system in contacting and conversing with another field unit. This is made possible by the provision of the data channel, by means of which the field unit that was placed on hold can be contacted by an operator when the operator is ready to resume communications with the field unit.

Figure 2:
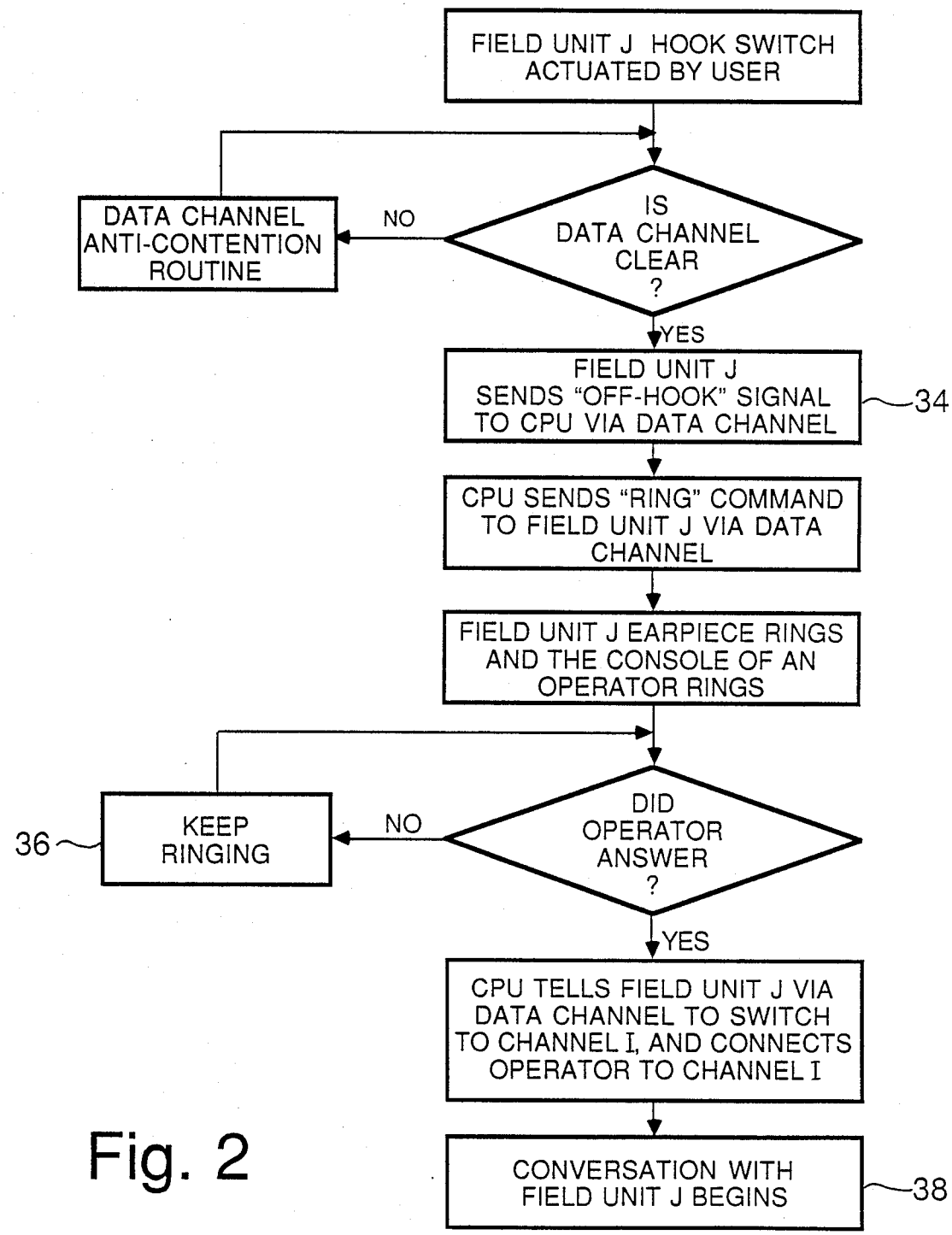
FIG. 2 is a flow chart showing the process used by the system in answering a call.

FIG. 2 is a flow chart that shows the steps normally taken in answering a call from a field unit.

Figure 3:
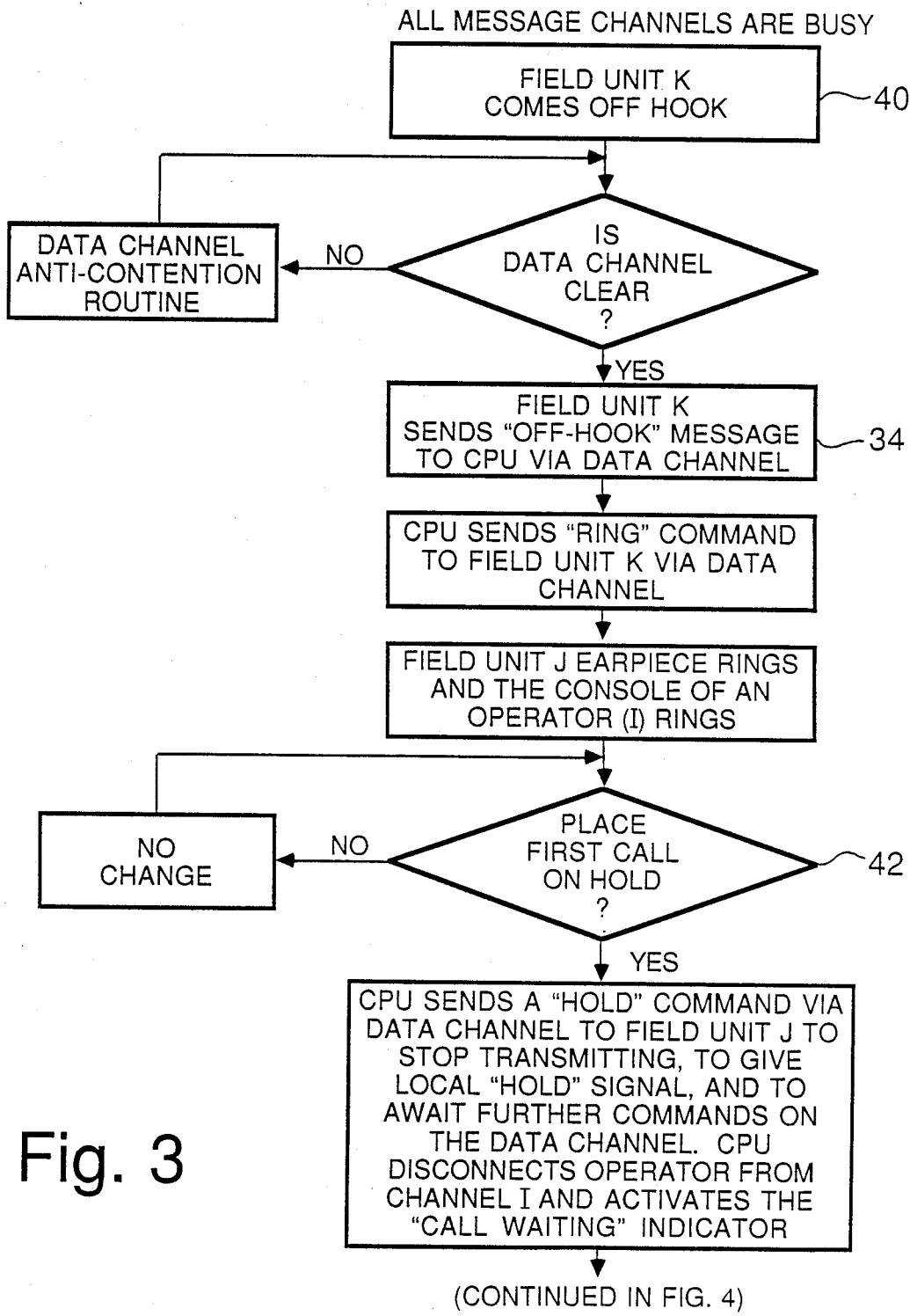
FIG. 3 is a flow chart showing the virtual hold process used in a preferred embodiment of the invention.
Figure 4:
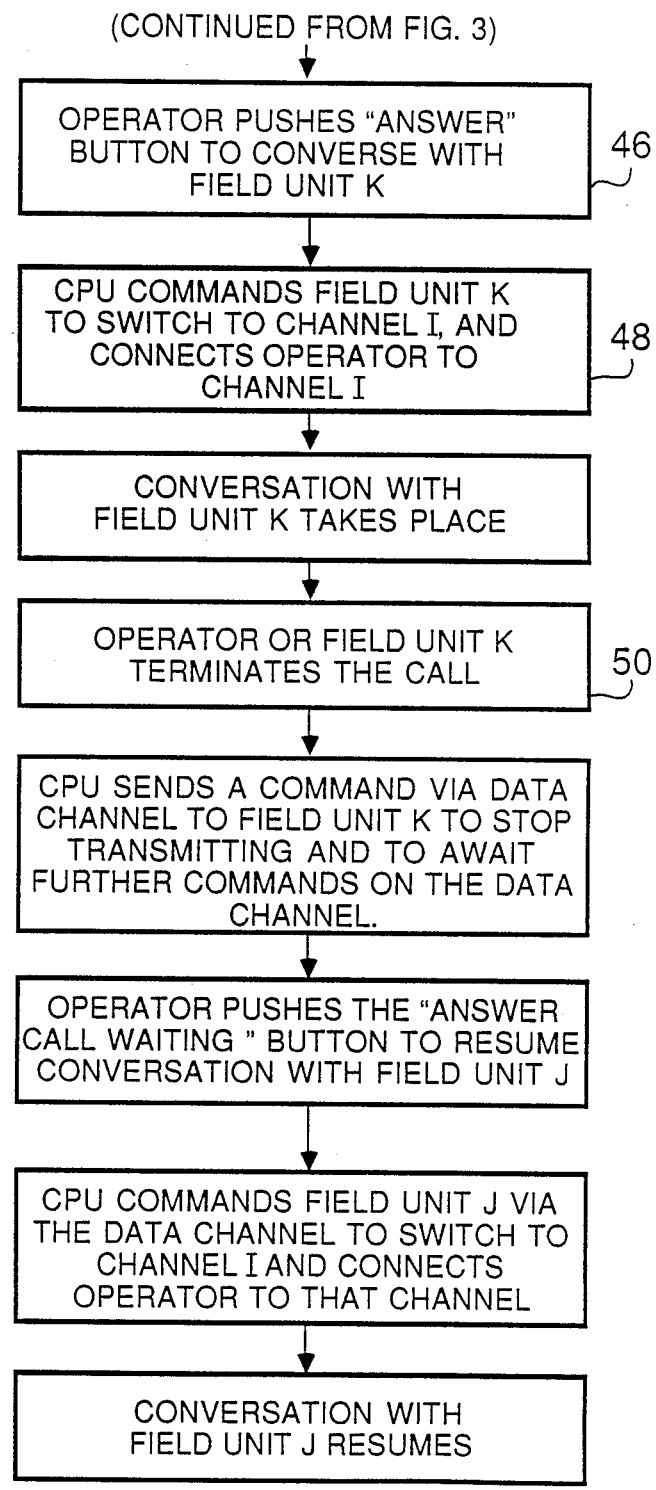
FIG. 4 is a flow chart which is a continuation of the flow chart of FIG. 3; and, FIG. 5 is a block diagram showing the signal path in the self-testing process used in a preferred embodiment of the invention.

FIGS. 3 and 4 are flow charts that show the steps taken when a first field unit J is put on hold so that an operator can answer a call from a second field unit K.

Familiarity with FIG. 2 is helpful in understanding the virtual hold process shown in FIGS. 3 and 4.

Figure 5:
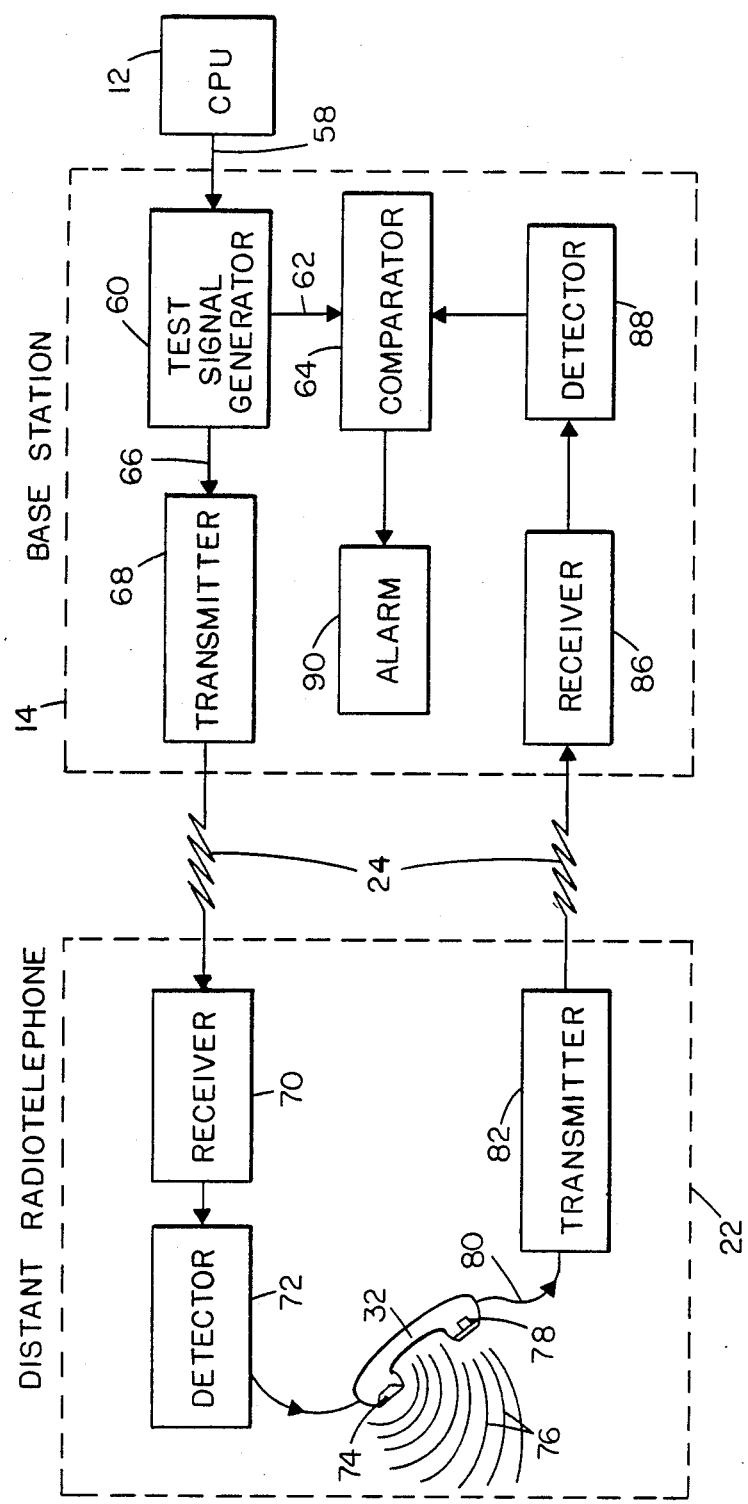

Turning now to FIG. 2, the process begins when the handset (32 of FIG. 5) of the field unit J is lifted from its cradle, thereby actuating the hookswitch. Actuation of the hookswitch causes the field unit J to use the data channel to contact the CPU via the data channel with an OFF-HOOK signal, as shown in box 34 of FIG. 2.

If, in preparing to send this signal, field unit J finds that the data channel is not then available, the field unit J follows the anti-contention routing described above until, eventually, the data channel becomes available and the OFF-HOOK signal is sent.

In response to receipt of the OFF-HOOK signal, the CPU sends a RING command to field unit J via the data channel. This command, when received by field unit J causes a ringing sound to be produced by the earpiece of the handset 32, so that the user will be assured that his call is being processed and that the system is operating. The CPU also sends a RING signal to the RING indicator 26 on the console 18 of operator I. As indicated by the box 36 of FIG. 2, the ringing at both the field unit J and at the operator's console 18 continues until the operator answers the call or the field unit hangs up. The operator 28 answers the call by pressing the ANSWER button 30 on her console 18. This action sends a signal to the CPU 12 which causes the CPU to command the field unit J, via the data channel, to switch to channel I. The CPU also connects the operator to channel I. At this point, the user at the field unit J is in direct communication with operator I, as indicated at box 38 of FIG. 2.

The process indicated in FIG. 2 is the usual manner in which the system answers a call initiated by one of the field units. It is noteworthy that the field unit merely responds to command signals initiated by the CPU, and these signals have the effect of actuating various switches in the field unit. Also, the role of the CPU in mediating the procedure has been clarified.

The procedure of FIG. 2 is followed each time a call is initiated from one of the field units. In a typical application of the system, a particular field unit may be in use only a relatively small fraction of the time. Clearly it would be wasteful to allocate a channel to each of the field units. One of the major advantages of the system described above is that channels are not assigned to the field units. Instead, a limited number N of message channels are provided, in addition a data channel, and the number of message channels N is typically much less than the number M of field units. An operator is provided for each of the N message channels.

To approach the virtual hold process described in FIGS. 3 and 4 it is necessary to assume that successive calls from the field units have been answered using the procedure of FIG. 2 until all of the message channels are in use.

Turning now to FIG. 3, and with all the message channels in use, a call is originated by field unit K as indicated at box 40. The steps from box 40 through box 42 inclusive are identical to the first few steps of FIG. 2. However, upon being notified that another call is being attempted, the operator must decide when and whether to place the first call on hold. For convenience of explanation, the first call is assumed to be from field unit J, and the second call is assumed to be from field unit K. Until the operator decides at decision box 42 to place the first call on hold, field unit K continues to generate the RING sound. The operator places the first call on hold by pressing the HOLD button 44 on her console 18. Actuation of the HOLD button sends a signal to the CPU 12 which causes the CPU to send a HOLD command, via the data channel, to field unit J to stop transmitting, to generate internally a local HOLD sound, and to await further commands on the data channel. The CPU also disconnects the operator from the channel that she had been using in conversing with field unit J. One reason for releasing this channel is that there may be another reason, other than a call waiting, for putting an existing call on hold. For example, the first caller may ask the operator to check on something, and while she does that task, the operator may place the first call on hold to make the channel available, even though she has no call waiting.

Assuming, however, that there is a call from field unit K waiting, the operator then answers the call from field unit K by pressing the ANSWER button 30 on her console, as indicated at box 46 of FIG. 4.

Actuation of the ANSWER button sends a signal to the CPU causing it to command the field unit K to switch to a channel chosen by the CPU from among the available channels, and the CPU also connects the operator to that same channel, which in box 48 is assumed to be channel I. Thereafter, the operator converses with the field unit K, and this conversation continues until either the operator or the field unit K terminates the call, as indicated at box 50 of FIG. 4. Termination of a call by the field unit occurs when the handset 32 is replaced in its cradle, and this change of status is reported to the CPU via the data channel. Receipt of such a signal by the CPU causes it to send a command via the data channel to the field unit K to stop transmitting and to await further commands on the data channel. The call to field unit K having been completed, the operator next pushes the ANSWER CALL WAITING button to resume her conversation with field unit J. Actuation of the ANSWER CALL WAITING button 52 sends a signal to the CPU, causing it to send a command via the data channel to field unit J, requiring field unit J to switch to an available channel (assumed to be channel I) and connects the operator to that same channel. Thereafter, the conversation between field unit J and the operator resumes.

It is crucial to recognize that when field unit J was put on hold, the message channel that had been used in conversing with field unit J was taken away from field unit J and made available for use as required. When the ANSWER CALL WAITING button is pushed to resume the conversation with the first caller, that call is assigned by the CPU to an available channel, which is not necessarily the channel originally used. Since the channel originally used does not have to sit idle during the holding period, the efficiency of the system is improved, assuming the freed channel can be used during the holding period, which is usually the case in the system described, in which the number of channels is relatively small compared to the number of field units.

Self-Testing Feature

As pointed out above in the Summary, the present invention includes features that make a communication system more efficient and more reliable. In the preceeding subsection it has been shown in detail how the virtual hold feature improves the efficiency of the system. In the present subsection it will be shown how the use of a particular type of system self-testing improves the reliability of the system. The self-testing feature is illustrated in the block diagram of FIG. 5.

The self-test feature of the system is initiated at specific times by the CPU 12, and in the preferred embodiment the self-testing operation can also be initiated manually. In either case, the CPU sends an initiating signal on the line 58 to the test signal generator 60. In response to the initiating signal, the test signal generator generates a test signal. In the preferred embodiment, the test signal consists of a pure tone in the audio frequency range. In other embodiments, the test signal may have other forms, such as a train of pulses or multiple audio tones. The generated test signal is applied via the line 62 to a comparator 64 and is also applied via the line 66 to the transmitter of a channel that is to be tested. The test signal is then transmitted via the channel 24 to the field unit 22 which, for convenience, will be referred to also as the distant radiotelephone. The transmitted test signal is received by the receiver 70 and detected by the detector 72 to recover the audio frequency portion. The audio frequency signal is then applied to the earpiece of the handset 32. The earpiece 74 is actually a small loudspeaker, and it converts the applied electrical signal to sound waves 76. Some of these sound waves find their way to the mouthpiece 78. The mouthpiece includes a microphone which converts the sound waves to an audio frequency signal on the line 80. The audio signal is applied to the transmitter 82, which transmits it via the data link being tested to the base station, where it is received by the receiver 86. The output of the receiver 86 is applied to the detector 88 so that the audio component is extracted, and the audio component is then applied to the comparator 64.

The comparator 64 compares the test signal generated initially with the signal, if any, that has been transmitted and returned to the base station. If the signals have the same frequency (in the preferred embodiment) or the same pulse structure (in other embodiments) they are deemed to be the same and the test is deemed to indicate that all of the components through which the signal passed are functioning satisfactorily. On the other hand, if the signal produced by the detector 88 does not compare favorably with the signal produced by the test signal generator, the comparator 64, upon sensing such a condition, sends a signal to the alarm 90 that announces that there is a fault in the loop. In the preferred embodiment, it is possible to switch the output of the transmitter 68 from its antenna to a non-radiating load and to apply a fraction of the power to the receiver 86 to determine whether the fault lies in the base station.

Since the self-test feature requires that louder-than-usual sound waves be produced by the earpiece 74, the CPU 12, which is made aware of the status of the distant radiotelephone via the data channel, does not initiate the self-test function when the field unit is in use, but instead carries out the self-testing only when the field unit is inactive.

In the preferred embodiment, the CPU is programmed to test all of the message channels and all of the field units. In this way, the self-test feature promptly draws attention to any malfunctions shortly after they have developed, so that an exceptionally high level of dependability can be maintained.

In known prior art systems, it was necessary to have a person go to each of the field units to test them. It is noteworthy that the self-testing feature of the present invention described above does not require human intervention until after a fault has been detected.

Conclusion

Thus, two inventive features of a communication system have been described. They are the virtual hold technique and the self-testing technique. In the virtual hold feature, when a call is put on hold, the message channel to the calling field unit is released for use elsewhere in the system, thereby improving the efficiency of the system.

The self-test feature includes the novel step of applying a test signal received by a field unit to the earpiece of the handset of the field unit so that sound waves generated by the earpiece will be picked up by the mouthpiece of the handset and transmitted back to the base station. In this manner, it is possible to test a field unit without having to have a person present at the field unit. The test has the further advantage of testing the handset of the field unit, which is susceptable to damage by vandalism.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. Apparatus for use in an operator-controlled communication system in which one message channel is connected to and directed by each operator for use in conversing with selected field units one at a time, said apparatus noteworthy for enabling an operator to place a first field unit on HOLD in order to answer a call from a second field unit, and enabling the operator to resume her conversation with the first field unit after having conversed with the second field unit for an arbitrary length of time, said apparatus comprising in combination:

a base station staffed by N operators and including a central processing unit;

a number M of field units distributed within a service area, where M is greater than N;

first means located in part at the field units and in part at the base station and constituting N message channels, each channel connected to one of the N operators, for selective use in carrying conversations between said base station and said field units;

second means located in part at the field units and in part at the base station and constituting a command channel for use by said base station in transmitting commands to said field units;

said central processing unit responsive to an operator-initiated HOLD command following a conversation on message channel I between operator I and field unit J to produce and to send via the command channel a command requiring field unit J to cease transmitting on message channel I and to await a further command on the command channel, thereby permitting the operator I to employ message channel I to hold a conversation with field unit K without interruption by field unit J;

said central processing unit responsive to an operator-initiated ANSWER CALL WAITING command following the conversation with field unit K to produce and to send via the command channel a command requiring field unit J to resume receiving and transmitting on message channel I.

2. The apparatus of claim 1 further comprising third means located at each of the field units for producing a HOLD signal at a particular field unit when that field unit has received a command requiring that field unit to cease transmitting and to await a further command on the command channel.

3. The apparatus of claim 2 wherein said third means are responsive to an ANSWER CALL WAITING command to cease production of the HOLD signal.

4. The apparatus of claim 2 wherein said HOLD signal is an audible signal.

5. The apparatus of claim 2 wherein said HOLD signal is a visible signal.

6. A method for use in a communication system in which one message channel is assigned to and directed by each operator for use in conversing with selected field units one at a time, said method noteworthy for enabling an operator to place a first field unit on HOLD in order to answer a call from a second field unit, and enabling the operator to resume her conversation with the first field unit after having conversed with the second field unit for an arbitrary length of time, said method comprising the steps of:

providing a common command channel by which operator-initiated commands are transmitted for reception by all of the field units;

sending a HOLD command to the first field unit via the common command channel requiring the first field unit to cease transmitting on and receiving the message channel and to receive instead the common command channel, whereby the message channel is freed from the first field unit;

answering the call from the second field unit and conversing with the second field unit via the message channel;

sending an ANSWER CALL WAITING command, after the conclusion of the conversation with the second field unit, to the first field unit via the common command channel, ordering the first field unit to resume receiving and transmitting on the message channel, whereby the operator can resume her conversation with the first field unit.

7. The method of claim 6 wherein the HOLD command also requires the first field unit to produce a HOLD signal and wherein the ANSWER CALL WAITING command requires the first field unit to stop producing the HOLD signal.

* * * * *